US010127332B2

(12) United States Patent
Gibson et al.

(10) Patent No.: US 10,127,332 B2
(45) Date of Patent: Nov. 13, 2018

(54) AUTOMATIC MOTION OF A COMPUTER-AIDED DESIGN MODEL

(71) Applicant: Dassault Systemes SolidWorks Corporation, Waltham, MA (US)

(72) Inventors: Mark Gibson, Cambridge, MA (US); Shrikant Vitthal Savant, Shrewsbury, MA (US); Kyeong Hwi Lee, Lexington, MA (US)

(73) Assignee: Dassault Systemes SolidWorks Corporation, Waltham, MA (US)

( * ) Notice: Subject to any disclaimer, the term of this patent is extended or adjusted under 35 U.S.C. 154(b) by 669 days.

(21) Appl. No.: 14/580,098

(22) Filed: Dec. 22, 2014

(65) Prior Publication Data

US 2015/0178414 A1    Jun. 25, 2015

Related U.S. Application Data

(60) Provisional application No. 61/920,406, filed on Dec. 23, 2013.

(51) Int. Cl.
*G06F 17/50* (2006.01)
*G06N 5/04* (2006.01)

(52) U.S. Cl.
CPC .......... *G06F 17/50* (2013.01); *G06F 17/5086* (2013.01); *G06N 5/04* (2013.01); *G06F 2217/06* (2013.01)

(58) Field of Classification Search
None
See application file for complete search history.

(56) References Cited

U.S. PATENT DOCUMENTS 5,835,693 A * 11/1998 Lynch .................... B25J 9/1605
345/473
5,892,849 A * 4/1999 Chun .................... H04N 19/503
375/E7.081

(Continued)

FOREIGN PATENT DOCUMENTS

WO    WO 2015/100336 A1    7/2015

OTHER PUBLICATIONS

International Search Report and Written Opinion of PCT/US2014/072176 dated Mar. 18, 2015 entitled "Automatic Motion of a Computer-Aided Design Model".

(Continued)

*Primary Examiner* — Kibrom K Gebresilassie
(74) *Attorney, Agent, or Firm* — Hamilton, Brook, Smith & Reynolds, P.C.

(57) ABSTRACT

A computer-implemented method automates motion of a computer-aided design (CAD) model. The CAD model represents a real-world object comprised of a number of parts. The part containing a user-specified entity is analyzed to collect data relevant to a motion study, for example, size data, location data, and material type data are collected. Based on the user-specified entity, parameters for automating motion are inferred and used to automate motion. The parameters include at least one of a part that is moved directly by a motor, a location on the part where the motor is mounted, a motor type, an axis of motion of the part, and a motion function indicating a change of motion over time.

20 Claims, 8 Drawing Sheets

(56) References Cited

U.S. PATENT DOCUMENTS

| | | | | |
|---|---|---|---|---|
| 6,056,108 A * | 5/2000 | Buchi | ............... | B25J 9/1697 198/395 |
| 6,243,096 B1 * | 6/2001 | Takanashi | ........... | G06F 3/04815 345/157 |
| 6,295,063 B1 * | 9/2001 | Minami | ............... | G06T 13/20 345/419 |
| 6,826,436 B1 * | 11/2004 | Bogan | ............... | G06F 17/5086 700/98 |
| 6,898,560 B1 * | 5/2005 | Das | ............... | G06F 17/50 703/22 |
| 7,313,504 B2 * | 12/2007 | Chin | ............... | G06T 17/10 700/97 |
| 7,853,940 B1 * | 12/2010 | Han | ............... | G06F 17/50 345/631 |
| 8,825,450 B2 * | 9/2014 | Artur | ............... | G06F 17/50 703/1 |
| 8,892,404 B2 * | 11/2014 | Potter | ............... | G06F 17/50 703/1 |
| 9,135,372 B2 * | 9/2015 | Delarue | ............... | G06F 3/0482 |
| 2002/0040291 A1 * | 4/2002 | Walacavage | ......... | G05B 19/056 703/23 |
| 2003/0045947 A1 * | 3/2003 | Wampler | ........... | G05B 19/4069 700/32 |
| 2011/0037213 A1 * | 2/2011 | Marrinan | ............... | B23Q 1/035 269/315 |
| 2011/0196533 A1 * | 8/2011 | Scheurer | ............... | B25J 9/1666 700/255 |
| 2012/0156362 A1 * | 6/2012 | Sadovoy | ............... | B05B 12/084 427/9 |
| 2012/0220194 A1 * | 8/2012 | Maloney | ............... | B24B 27/0038 451/5 |
| 2014/0363532 A1 * | 12/2014 | Wolfgram | ........... | B29C 67/0085 425/113 |
| 2015/0178413 A1 * | 6/2015 | Gibson | ............... | G06F 17/50 703/1 |
| 2015/0293525 A1 * | 10/2015 | Yamamoto | ............... | G06T 19/20 702/182 |

OTHER PUBLICATIONS

Hsu, C., et al. "A Constraint-Based Manipulator Toolset for Editing 3D Objects"; Proceedings of the Fourth Symposium on Solid Modeling and Applications; Atlanta, Georgia—May 14-16, 1997.

Sohrt, W., et al. "Interaction with Constraints in 3D Modeling" SMA '91 Proceedings of the First ACM Symposium on Solid Modeling Foundations and CAD/CAM Applications, pp. 387-396, Jun. 5, 1991.

Bier, E.A., "Snap-Dragging in Three Dimensions"; Proceedings Symposium on Interactive 3D Graphics 24:2, pp. 193-204; Mar. 25, 1990.

Sutherland, I.E., "Sketchpad: A Man-Machine Graphical Communication System"; Technical Report No. 712; pp. 1-149, Jan. 1, 1963.

Howard, William, et al. "Introduction to Solid Modeling Using SolidWorks 2011", pp. 1-31; Jan. 1, 2011.

International Preliminary Report on Patentability for PCT/US2014/072176 dated Jul. 7, 2016 entitled "Automatic Motion of a Computer-Aided Design Model".

* cited by examiner

US 10,127,332 B2

AUTOMATIC MOTION OF A COMPUTER-AIDED DESIGN MODEL

RELATED APPLICATION

This application claims the benefit of U.S. Provisional Application No. 61/920,406, filed on Dec. 23, 2013. The entire teachings of the above application are incorporated herein by reference.

BACKGROUND OF THE INVENTION

Computer-aided design (CAD) software allows a user to construct and manipulate complex three-dimensional (3D) models. A number of different modeling techniques can be used to create a 3D model. One such technique is a solid modeling technique, which provides for topological 3D models where the 3D model is a collection of interconnected topological entities (e.g., vertices, edges, and faces). The topological entities have corresponding supporting geometrical entities (e.g., points, trimmed curves, and trimmed surfaces). The trimmed surfaces correspond to respective topological faces bounded by edges. CAD systems may combine solid modeling and other modeling techniques, such as parametric modeling techniques. Parametric modeling techniques can be used to define various parameters for different features and components of a model, and to define relationships between those features and components based on relationships between the various parameters.

A design engineer is a typical user of a 3D CAD system. The design engineer designs physical and aesthetic aspects of 3D models, and is skilled in 3D modeling techniques. The design engineer creates parts and may assemble the parts into a subassembly or an assembly. A subassembly may also consist of other subassemblies. An assembly is designed using parts and subassemblies. Parts and subassemblies are hereinafter collectively referred to as components.

During the design process, an engineer may wish to analyze the motion of a 3D design of a model to evaluate the real-world requirements and performance of the product being designed. Such an analysis may be executed by an engineering simulation process, for example, SolidWorks® Simulation Xpress and SolidWorks® Simulation, both of which use the CAD model data to set up and execute simulation studies and both of which are available from Dassault Systemes Solidworks Corporation of Waltham, Mass.

Analyzing the motion of a mechanism early in the design phase helps determine what constraints need to be included in the CAD model, and thereby, how the physical mechanism represented by the CAD model needs to be constrained. During motion analysis, a 3D representation of a real-world assembly of parts is put in motion by attaching one or more motor components or motion elements (e.g., springs and dampers) to one or more of the 3D parts in the CAD model. The design engineer then studies the effect of the motion input data (e.g., the part directly moved, the location of the motor on the part, and the type of motor) on part displacements, velocities, accelerations, joint forces, joint torques, and motor forces and torques required to cause the motion. The motion analysis results are important for various design tasks, including path-planning, workspace determination, interference detection, proximity sensing, and motor-sizing. These results can also be used as a basis for doing more advanced analyses such as multi-physics simulations and finite element analysis.

To perform a proper motion analysis, the design engineer has to define all the motions that drive the mechanism in a desired way, which requires a significant amount of input from the design engineer. For example, for motion analysis, current state-of-the-art CAD systems require a design engineer to specify as motion input data (1) the part that is directly moved by the motor, (2) the location on the part where the motor needs to be mounted, (3) the type of the motor, for example, linear, rotary, or path, (4) the axis of motion of the part, (5) the motion function that describes how the motion changes over time (e.g., ramp or sinusoidal functions) or other model parameters (e.g., switch off the motor when an edge of a plane or an end of a path is reached), and (6) the reference part relative to which the motion function is defined (e.g., to define a local coordinate system for the motion).

Because of the large amount of information needed to define motion for a CAD model, applying the desired motion to the 3D model that represents a real-world mechanism becomes a multistep and burdensome task for the design engineer, especially for one inexperienced or not well-trained in motion analysis techniques. Therefore, motion analysis is a task that is not often performed in an early design iteration loop, which may lead to a poor, inefficient, and less economical design. Generally, the motion input data previously described must be defined in a step-by-step fashion so that the desired motion of the assembly can be obtained. This multi-step and burdensome task deters design engineers from performing motion analysis.

Time-saving advantages and enhancements to current state-of-the-art CAD systems may be achieved by providing more efficient means for performing motion analysis early in the design phase, resulting in an appropriately constrained 3D model and real-world mechanism represented by the 3D model. Allowing the design engineer to drive the motion of an assembly with a minimal amount of input would enhance the capabilities of a 3D CAD system.

SUMMARY OF THE INVENTION

In general, in one aspect, embodiments of the invention feature a computer-implemented method for automating motion of a computer-aided design (CAD) model. The CAD model represents a real-world object comprised of a number of parts, each of which also represents a physical object. An entity belonging to one of the parts is specified. The part containing the entity is analyzed to collect data relevant to a motion study, for example, size data, location data, and material type data. Furthermore, based on the specified entity, parameters for automating motion are inferred and used to automate motion.

Embodiments determine an axis of motion for the part containing the selected entity where the axis of motion is based on one or more degrees of freedom with respect to the part. Furthermore, the one or more degrees of freedom are determined by one or more constraints and the location of the constraints.

Other embodiments include a computer-aided design (CAD) system having a processor operatively coupled to a data storage system and a data storage memory operatively coupled to the processor. In such embodiments, the data storage system stores a three-dimensional model, and the data storage memory comprises instructions to configure the processor to automate motion of a computer-aided design (CAD) model. The CAD model represents a real-world object comprised of a number of parts, each of which also represents a physical object. Further instructions enable an entity belonging to one of the parts to be specified and the part containing the entity to be analyzed to collect data relevant to a motion study (e.g., size data, location data, and material type data). Additionally, based on the specified entity, parameters for automating motion are inferred and used to automate motion.

Yet other embodiments include a computer-readable data storage medium containing instructions for automating motion of a computer-aided design (CAD) model. The CAD model represents a real-world object comprised of a number of parts, each of which also represents a physical object. Instructions enable an entity belonging to one of the parts to be specified and the part containing the entity to be analyzed to collect data relevant to a motion study (e.g., size data, location data, and material type data). Additionally, based on the specified entity, parameters for automating motion are inferred and used to automate motion.

Aspects of the invention include determining an axis of motion for the part containing the selected entity where the axis of motion is based on one or more degrees of freedom, and determining the one or more degrees of freedom by one or more constraints and the location of the constraints. Other aspects of the invention include parameters for automating motion that are a part that is moved directly by a motor, a location on the part where the motor is mounted, a motor type, an axis of motion of the part, and/or a motion function indicating a change of motion over time. The motor type may be a linear, a rotational, or along a path, and dependent upon the entity and one or more degrees of freedom determined by one or more constraints on the part. Further aspects include the model may be a two-dimensional or a three-dimensional CAD model, storing a hierarchical map of parent-child relationships among the plurality of parts and using the hierarchical map for automating motion of the CAD model such that a motion of a part is relative to a parent part, and displaying an indicator of an implied direction of motion for selection of an explicit direction of motion.

The details of one or more embodiments of the invention are set forth in the accompanying drawings and the description that follows. Other features, objects, and advantages of the invention will be apparent from the description and drawings, and from the claims.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Superior designs of real-world objects may be more easily achieved by performing engineering analysis during the early stages of designing a model of a real-world object, rather than relegating such analysis to a later stage in the design cycle. By performing advanced engineering analysis up-front as part of a design iteration phase (e.g., constructing, analyzing, and refining a 3D model), a design engineer can create sound engineering designs that may work better than those where analysis was performed in more advanced stages of the design process. For example, modifying elements of a designed model may be difficult due to choices already made about the design and components already constructed with respect to the model design. In the process of performing advanced engineering analysis in the early stages of designing a real-world object and throughout the various design stages, costly physical design iterations with respect to the real-world object can be minimized.

The present invention allows a design engineer to drive an assembly with minimum input (e.g., one click of a mouse or one touch on a touchscreen device) that infers all the necessary parameters for the motion analysis. The only input required of the design engineer is to select the proper geometry and the present invention deduces the remaining input that is necessary to conduct motion analysis or assumes what the remaining input should likely be. The correct and desired motion is then applied to the assembly. If needed, the design engineer can easily change the default motion by overriding it. This allows the design engineer to detect any flaws in the assembly quickly and create complex assembly motion very easily.

Figure 1:
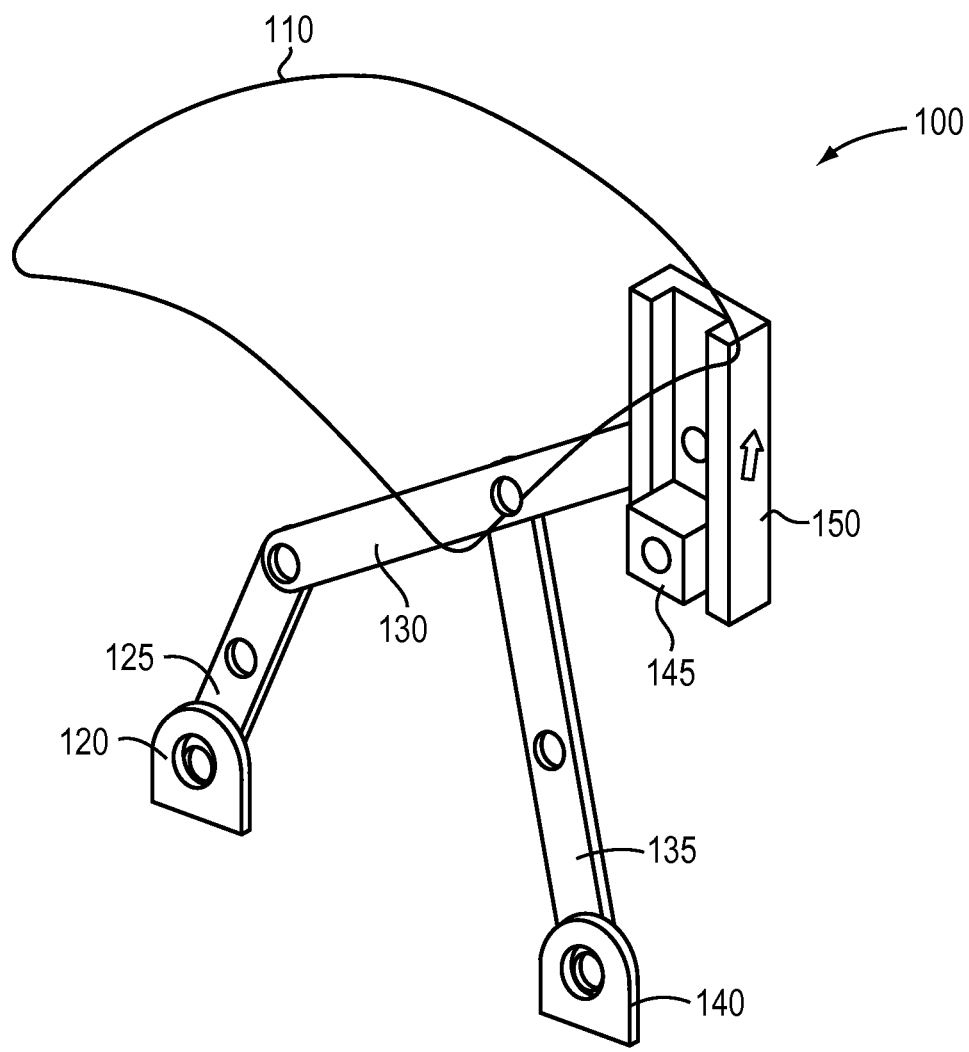
FIG. 1 is an illustration of a computer-aided design (CAD) model.

Referring now to FIG. 1, an illustration of a computer-aided design (CAD) model 100 is shown. The model 100 contains parts 120-150 that are constrained to at least one other part. Parts 120 and 140 are also constrained to the ground, which is beneath parts 120 and 140. A path 110 along which part 150 moves is also shown in FIG. 1.

Figure 2:
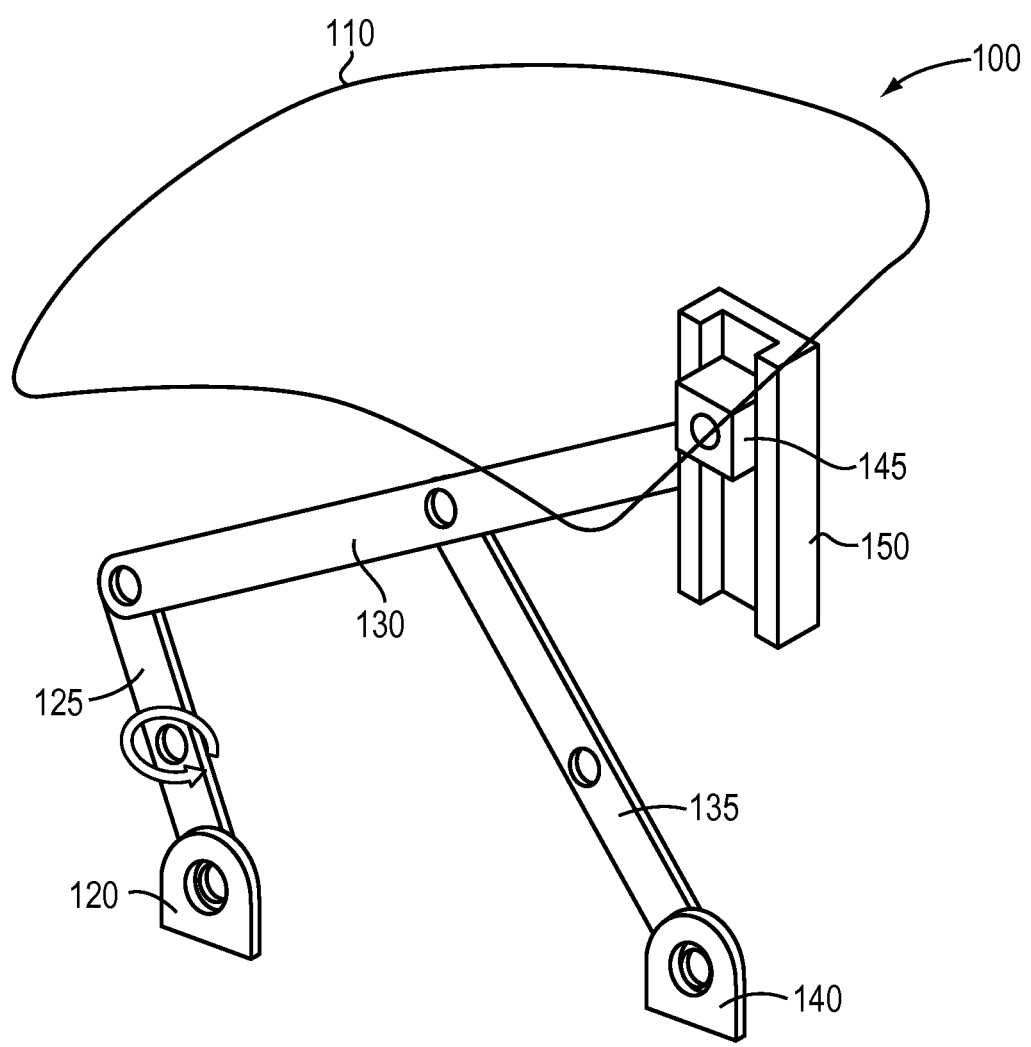
FIG. 2 is an illustration of the computer-aided design (CAD) model in FIG. 1 after motion to one or more parts has occurred.

FIG. 2 is an illustration of CAD model 100 after parts 120-150 have undergone motion in an embodiment of the present invention. As shown in FIG. 2, part 150 is at a different location on the path 110. Additionally, the orientations of parts 125 and 135 are at different angles with respect to part 130 than as shown in FIG. 1 due to motion of model 100. The orientations of parts 125 and 135 are also at different angles to parts 120 and 140, respectively, due to motion of model 100. Unlike current-state-of-the-art systems that may only apply motion to one mate relationship (e.g., one constraint for door hinge), the present invention accounts for multiple mating relationships, which establish constraints (e.g., mating relationships between the ground and part 120, between parts 120 and 125, between parts 125 and 130, between parts 130 and 150, between parts 150 and 145, between the ground and part 140, between parts 140 and 135, and between parts 135 and 130).

The present invention analyzes a part that represents a real-world object constructed during a CAD modeling process in a two-dimensional (2D) or a three-dimensional (3D) environment, and determines what type of motion to apply to the part based on the degrees of freedom of the part and a selected entity of the part. The present invention accomplishes this with limited user input (e.g., with one click of a mouse button or one tap on a touch-sensitive screen) to select an entity in one of the parts in a CAD model. After an entity is selected, the present invention can determine automatically (1) the part that is moved by the motor or motion element, (2) the location on the part where the motor needs to be mounted, (3) the type of the motor, for example, linear, rotary, or path, (4) the axis of motion of the part, (5) the motion function that describes how the motion changes over time or other model parameters, and (6) the reference part relative to which the motion function is defined. Thus, motion is automatically applied instantly upon a single user selection.

Determination of the motion type (e.g., linear, rotational, or along a path), and therefore the type of motor, and the axis of motion are dependent upon the combination of the entity selected and the calculation of the degree(s) of freedom of the selected part. The motion function can be ramp, harmonic, or when an edge is detected, the part stops, turns, or reverses direction. This is determined by analyzing the model. For example, the design engineer may have established parameters to detect collision between two parts. When motion is then applied and if those two parts collide (or come within some distance of one another), the motion of those parts takes place according to the collision parameters defined by the design engineer and the motion solver calculates the proper motion.

The default reference part may represent the ground, a table, or a part to which the selected part is mounted. Each model stores a hierarchical map of parent-child relationships among various parts in the model. This information is used to apply motion to a part such that the motion is relative to its parent part by default. This assumption is true in most cases. But if this is not true in a specific case, then the design engineer has the option to change the reference part to another part in the model.

Additionally, proper motion is applied to 2D mechanisms without violating any 2D constraints, which differ from 3D constraints due to the inherent one-plane construction enabling movement in only two dimensions.

Figure 3:
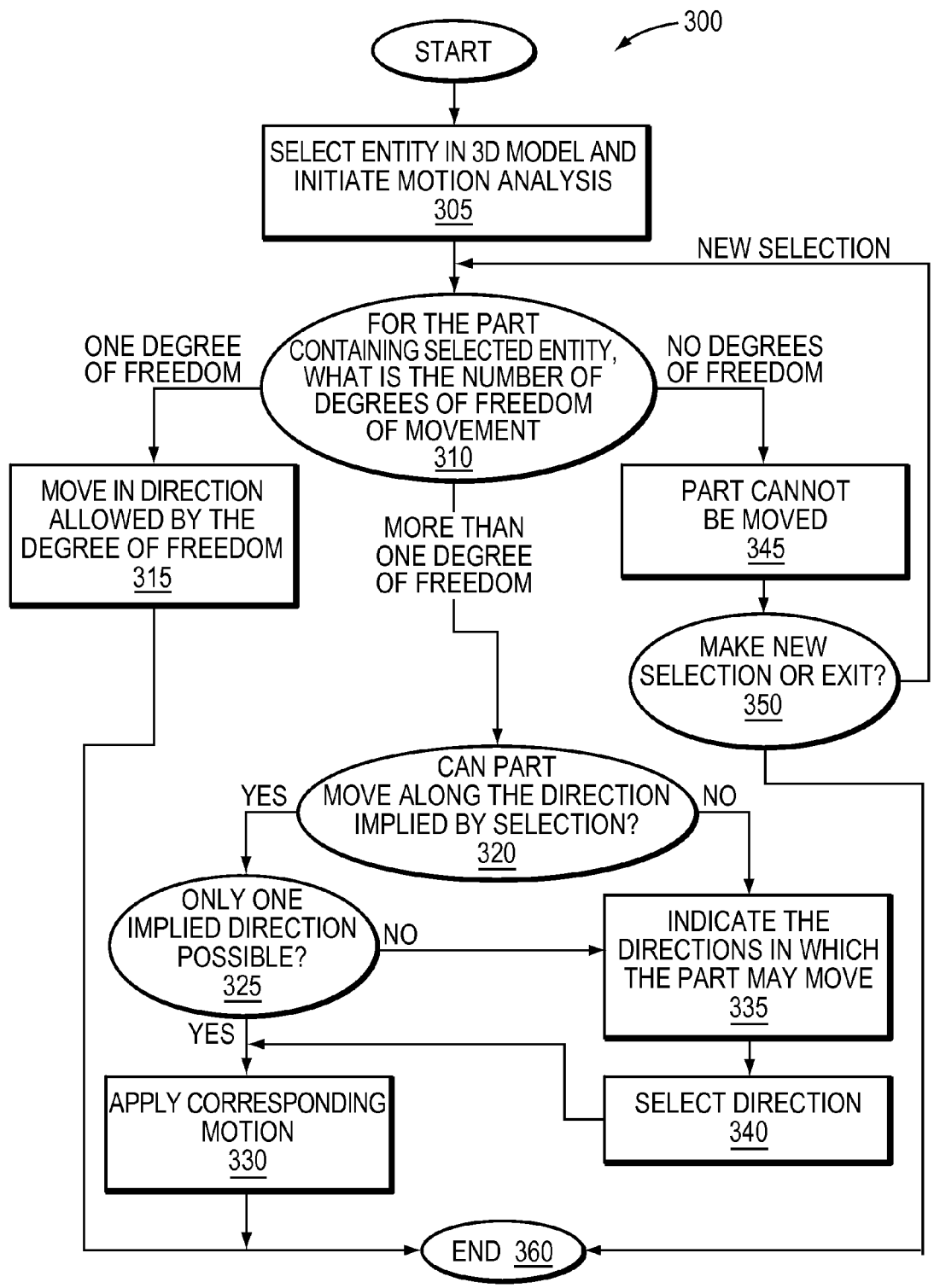
FIG. 3 is a flow diagram containing steps for determining the direction motion may occur.

Referring now to FIG. 3, a flow diagram is shown of a process 300 that determines the direction of motion (if any) that may occur with respect to a selected part. Process 300 begins when the design engineer selects an entity in a 3D model and initiates a command to begin the motion analysis (step 305). Alternatively, the design engineer may initiate the command to begin the motion analysis prior to selecting an entity. The selected entity (i.e., geometry that indicates a face, edge, or vertex) provides information to determine the part that will be directly moved by the motor and the location on the part where the motor will be mounted. By way of non-limiting example, selecting a face on a part specifies that the motor will be mounted at a center location on the face; selecting an edge of a part specifies that the motor will be mounted on the center of the edge, and selecting a vertex of a part specifies that the motor will be mounted on the vertex. The location on the part where the motor is mounted may always be overridden by the design engineer.

In the following steps, process 300 determines how a part is going to move based on the selection of the entity (steps 310-350). Once the design engineer makes a selection and initiates the command to begin the motion analysis (step 305), process 300 checks if the part from which the entity is selected has one or more than one degrees of freedom of movement (step 310). The number of degrees of freedom is determined by analyzing the mating relationships the part containing the selected entity has with other parts and a reference that may represent the ground or a table to which the selected part is anchored. Not only are the number of mating relationships taken into account, the location of the mates is also a factor used in the analysis. Moreover, the more mating relationships (i.e., constraints) a part has, the fewer degrees of freedom a part has.

If the part has only one degree of freedom of movement, no ambiguity exists about how the part should move, and therefore, the part will move in the direction allowed by the one degree of freedom (step 315). If the single degree of freedom of movement allows linear motion, then the part will move linearly along an x, y, or z axis. If the degree of freedom of movement allows only rotary motion, then the part will rotate about an x, y, or z axis, the axis reflecting the one degree of freedom for the part. The axis of motion is inherent in the selection because direction is implied.

If the part has more than one degree of freedom, process 300 analyzes the part to determine if the part can move along a direction implied by the selection (step 320). This determination may be accomplished first by calculating the degrees of freedom the part has, as is done by the SolidWorks® 2014 motion studies functionality. For example, a concentric mate between two rigid parts removes two translational degrees of freedom and two rotational degrees of freedom with respect to the two rigid parts. Once the degrees of freedom are calculated, then process 300 compares those degrees of freedom with one or more directions implied by the selection. In an embodiment, selecting a cylindrical surface corresponding to a face of a part implies that the axis of motion correlates to the degree of freedom allowing rotation about an axis in the center of the cylindrical surface and extending through the ends of the cylinder. Selecting a flat surface implies that the axis of motion corresponds to a translational degree of freedom in the direction normal to the selected surface, and therefore, the motion will be linear.

If the part can move along a direction implied by the selection, procedure 300 then ensures that only one implied direction is possible given the selection (step 325). For example, a face may be selected and that face may be able to rotate about an axis normal to the face and translate along that same axis. If only one implied direction of motion is possible, then the corresponding motion (e.g., linear or rotary) is applied to the part along the selected direction (step 330).

If the part has more than one implied direction of motion, the present invention indicates the directions in which the part may move (step 335). In an embodiment, arrows are shown corresponding to the directions in which the part can move. Other embodiments may display a user interface listing the directions in which a part may move. The design engineer may then select the direction of motion by selecting the respective arrow or a direction from a list denoting the desired direction (step 340). In the next step, the part is moved along that direction and the corresponding motion applies (step 330).

If the part cannot move in any direction (i.e., the part has no degrees of freedom), then a message is displayed indicating to the design engineer that the part cannot be moved and the design engineer then makes another selection or chooses to exit the procedure (step 350).

Process 300 can be modified for 2D models. In the 2D case, only three degrees of freedom need to be calculated. A selected part is then analyzed to determine whether that part may move in one or more directions that may be implied given a selected 2D entity.

Figure 4:
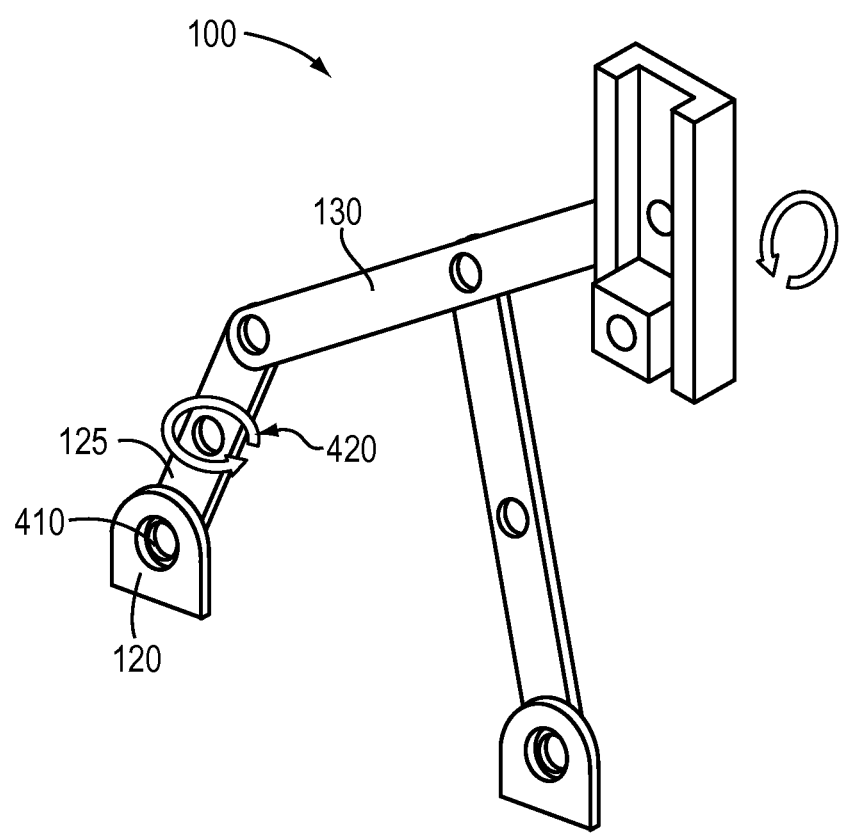
FIG. 4 is an illustration of how a part may move.

Referring now to FIG. 4, an example of how a selected part belonging to CAD model 100 may move is shown. In FIG. 4, an entity of part 125 is selected. Due to the mating relationships between part 125 and part 120, and part 125 and part 130, part 125 is constrained such that part 125 only has one degree of freedom. Therefore, it does not matter what entity of part 125 is selected, the only direction part 125 may be moved is rotationally about the hole 410. The direction of rotation is indicated by arrow 420.

Figure 5:
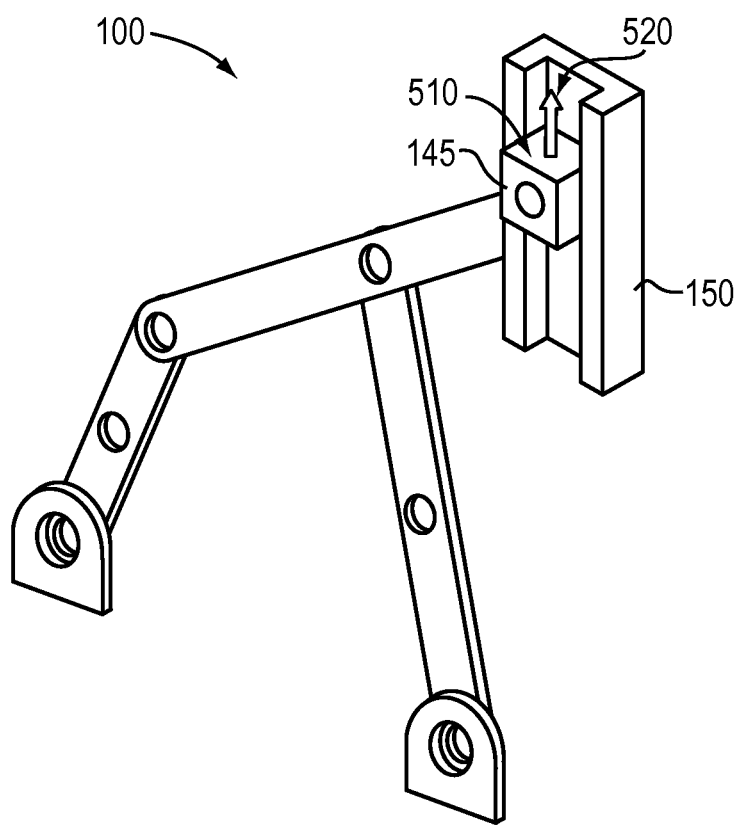
FIG. 5 is an illustration of how a part may move.

FIG. 5 illustrates how a different part belonging to CAD model 100 may be moved. In FIG. 5, the top face 510 of part 145 is selected. In this example, the back side of part 145 inside the bracket, which is part 150, may not be constrained such that it may be pulled out of the bracket. Additionally, the top face 510 and the bottom face (unseen) of part 145 may not be constrained. Thus, part 145 has two degrees of freedom. However, the selection of top face 510 implies that the desired motion is a translational motion in the direction indicated by arrow 520.

Figure 6:
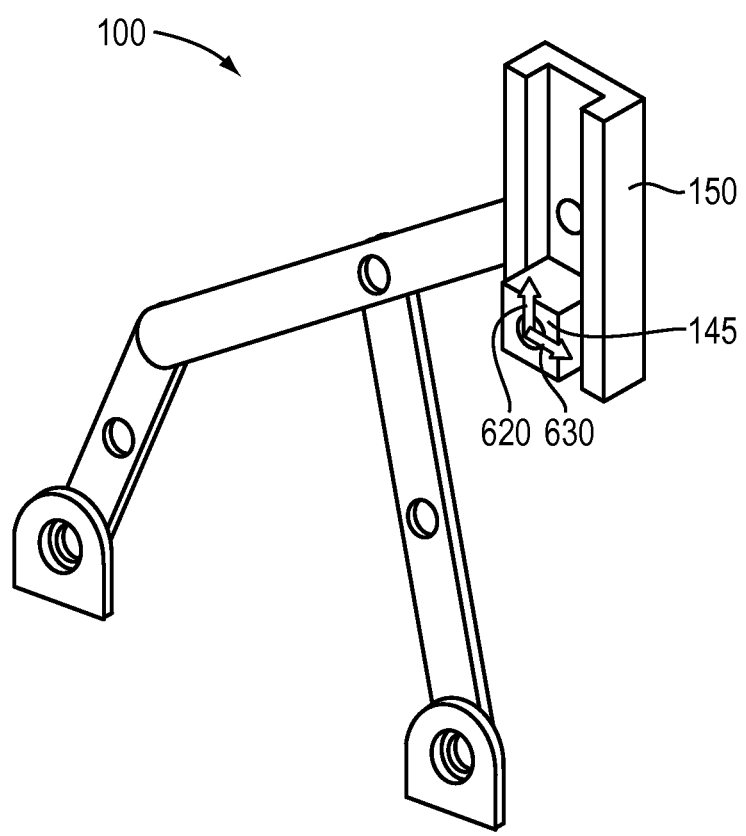
FIG. 6 is an illustration of how a part may move.
Figure 7:
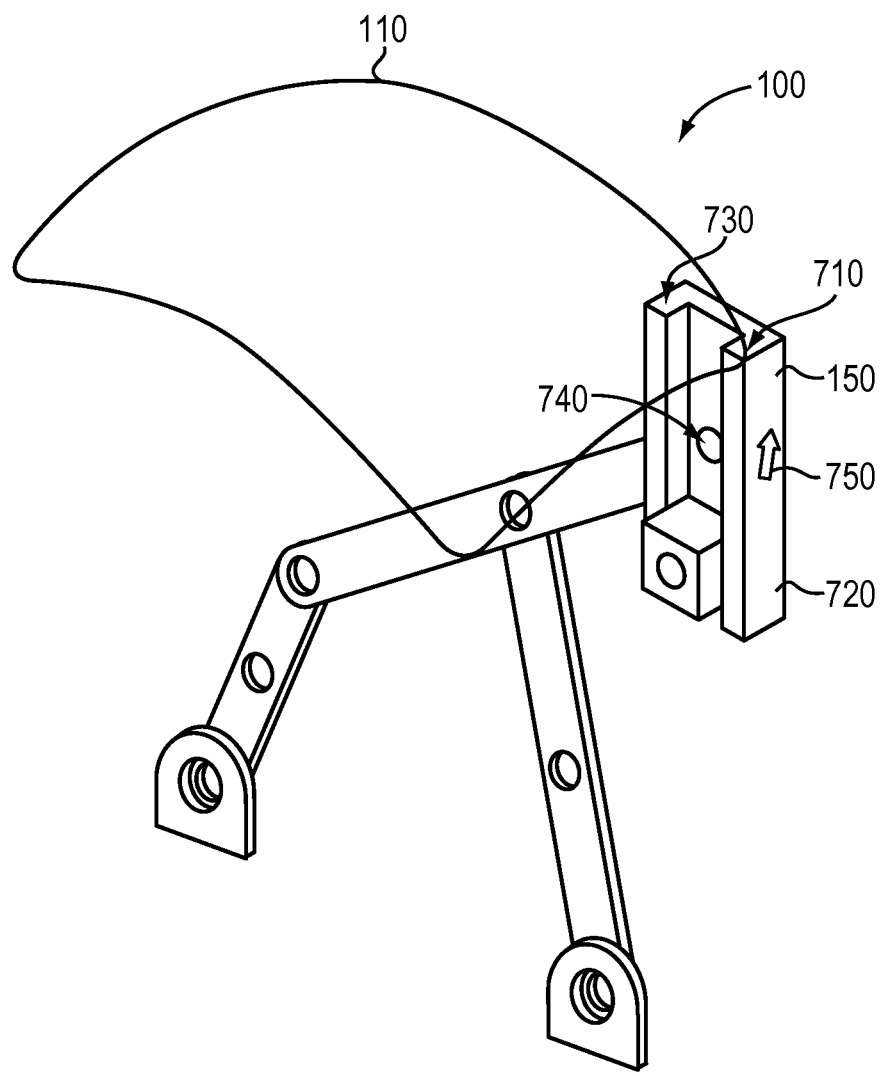
FIG. 7 is an illustration of how a part may move.

FIG. 6 further illustrates how part 145 belonging to CAD model 100 may be moved. In FIG. 6, the front face of part 145 is selected, as indicated in FIG. 7 because of the front face is highlighted. Given in this example, that part 145 is constrained to preclude rotations about any axis and part 145 is further constrained such that part 145 cannot be pulled out of the bracket, which is part 150 (unlike the example described with respect to FIG. 5), the direction of motion is not possible to ascertain based on the user selection. Thus, arrow 620 and arrow 630 are displayed showing the two degrees of freedom so that the design engineer may select one of the arrows to indicate the direction of motion. In this case the arrows show the global directions of motion. Thus, the horizontal motion of part 145 is possible by taking the motion of part 150 also into account.

Referring now to FIG. 7, CAD model 100 is shown with a path 110 that traces a point that is a vertex 710 of a face 720 of part 150. Vertex 710 is traced as the assembly, which is CAD model 100, goes through a rotation. Part 150 is constrained such that the top face 730 remains horizontal such that rotation around the center hole 740 of the bracket is not possible. The degree of freedom shown in FIG. 7 is a translational degree of freedom tangentially along a curve, which is path 110. Arrow 750 illustrates the direction of travel at an instant in time captured in FIG. 7.

The present invention further determines the length of travel and duration of the motion simulation based on the zoom factor controlling the size of the model in a window for linear motion and, by default, one 360-degree rotation in five seconds for rotary motion. By default, the selected part will not move such that the part is no longer visible on the screen. Also by default, the duration of the motion analysis is five seconds. As an example, in five seconds, a part will glide across a table when the length of the table corresponds to the width of the window; and in five seconds the part will glide across half of the table when half the length of the table corresponds to the width of the window. Both the length of travel and the duration of the motion simulation may be modified by the design engineer. Further embodiments of the present invention include motion animation functionality enabling the motion to be played, paused, and reset.

Figure 8:
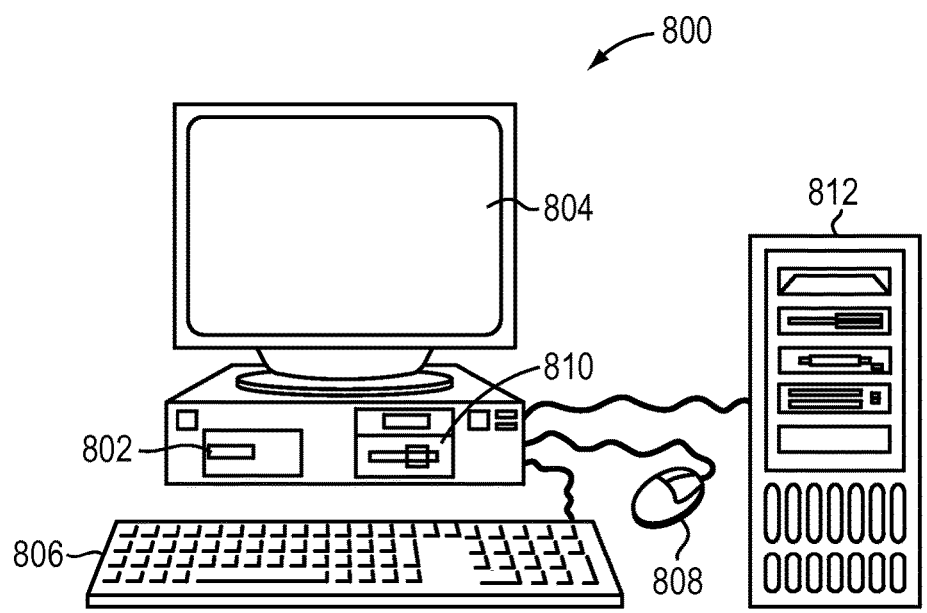
FIG. 8 is a diagram of a computer system in which embodiments of the present invention may be implemented.

FIG. 8 illustrates a computerized modeling system 800 that includes a CPU 802, a computer monitor 804, a keyboard input device 806, a mouse input device 808, and a storage device 810. The CPU 802, computer monitor 804, keyboard 806, mouse 808, and storage device 810 can include commonly available computer hardware devices. For example, the CPU 802 can include an Intel-based processor. The mouse 808 may have conventional left and right buttons that the design engineer may press to issue a command to a software program being executed by the CPU 802. As an alternative or in addition to the mouse 808, the computerized modeling system 800 can include a pointing device such as a trackball, touch-sensitive pad, or pointing device and buttons built into the keyboard 806. Those of ordinary skill in the art appreciate that the same results described herein with reference to a mouse device can be achieved using another available pointing device. Appropriate computer hardware platforms that are suitable will become apparent from the discussion herein. For example, a computerized modeling system may have a touchscreen display that enables keyboard and pointing functionality without needing a keyboard or mouse. Such computer hardware platforms are preferably capable of operating the Microsoft Windows 7, UNIX, Linux, or MAC OS X, iOS, or Android operating systems.

Additional computer processing units and hardware devices (e.g., rapid prototyping, video, and printer devices) may be included in the computerized modeling system 800. Furthermore, the computerized modeling system 800 may include network hardware and software thereby enabling communication to a hardware platform 812, and facilitating communication between numerous computer systems that include a CPU and a storage system, among other computer components.

Computer-aided modeling software (e.g., process 300) may be stored on the storage device 810 and loaded into and executed by the CPU 802. The modeling software allows a design engineer to create and modify a 2D and/or a 3D model and implements aspects of the invention described herein. The CPU 802 uses the computer monitor 804 to display the 2D and/or a 3D model and other aspects thereof as described. Using the keyboard 806 and the mouse 808, the design engineer can enter and modify data associated with the 3D model. The CPU 802 accepts and processes input from the keyboard 806 and mouse 808. The CPU 802 processes the input along with the data associated with the 2D and/or 3D model and makes corresponding and appropriate changes to that which is displayed on the computer monitor 804 as commanded by the modeling software. In one embodiment, the modeling software is based on a solid modeling system that may be used to construct a 3D model consisting of one or more solid and surface bodies.

Embodiments of the invention may be implemented in digital electronic circuitry, or in computer hardware, firmware, software, or in combinations thereof. Apparatuses may be implemented in a computer program product tangibly embodied in a machine-readable storage device for execution by a programmable processor; and method steps may be performed by a programmable processor executing a program of instructions to perform functions by operating on input data and generating output. Embodiments of the invention may advantageously be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; in any case, the language may be a compiled or interpreted language. Suitable processors include, by way of non-limiting example, both general and special purpose microprocessors. Generally, a processor will receive instructions and data from a read-only memory and/or a random access memory and in some embodiments instructions and data may be downloaded through a global network. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, custom-designed ASICs (application-specific integrated circuits).

Embodiments of the present invention or aspects thereof described herein may be implemented in the form of hardware, firmware, or software. If implemented in software the software may be stored on any non-transient computer readable medium that is configured to enable a processor to load the software or subsets of instructions thereof. The processor then executes the instructions and is configured to operate or cause an apparatus to operate in a manner as described herein.

Although the present invention is described in connection with an exemplary computer system environment, embodiments of the invention are operational with numerous other general purpose or special purpose computer system environments or configurations. The computer system environment is not intended to suggest any limitation as to the scope of use or functionality of any aspect of the invention. Moreover, the computer system environment should not be interpreted as having any dependency or requirement relating to any one or combination of components illustrated in the exemplary operating environment. Examples of computer systems, environments, and/or configurations that may be suitable for use with aspects of the invention include, but are not limited to, personal computers (PCs), server computers, hand-held and laptop devices, multiprocessor systems, microprocessor-based systems, set top boxes, programmable consumer electronics, mobile telephones and mobile operating systems, network PCs, minicomputers, mainframe computers, distributed computing environments that include any of the above systems or devices, and the like. The computer system may have standalone components or workstations, or the computer system may be formed of networked computers by any of known communications networks, processing networks, cloud-based networks, related protocols and the like.

As can be appreciated, the network can be a public network, such as the Internet, or a private network such as an LAN or WAN network, or any combination thereof and can also include PSTN or ISDN sub-networks. The network can also be wired, such as an Ethernet network, or can be wireless such as a cellular network including EDGE, 3G and 4G wireless cellular systems. The wireless network can also be WiFi, Bluetooth, or any other wireless form of communication that is known. Thus, the network is merely exemplary and in no way limits the scope of the present advancements.

The embodiments disclosed herein offer significant advantages over present technology, including providing an extremely easy and quick way to define motion, methods to easily create complex assembly motion, an efficient way to do what-if analyses, and instant visual feedback that allows users to spot errors quickly. To begin a motion analysis process can take much time and effort by a design engineer; however, using the present invention can be accomplished with just one click of a mouse button or one touch to a touch-sensitive screen. This allows the design engineer to detect any flaws in an assembly quickly and create complex assembly motion very easily.

Another advantage is that the present invention enables many more design engineers to use motion simulation capabilities earlier in the design iteration loop by making motion simulation an extremely easy operation to perform without requiring the design engineer to have any special analysis expertise. Further advantages include enabling tight integration of analysis in the computer-aided design workflow, and if needed, converting the motion into a motion study (e.g., a SolidWorks® 2014 motion study) for more elaborate and detailed motion analysis. The present invention is useful at all stages of progressively building an assembly, and therefore, applicable even if the design is not fully defined. Yet another advantage is that analysis results are applied to the assembly transiently without adversely affecting the original design of the product; that is, the motion applied to the parts does not change the position of the parts as designed; once the motion completes, the parts move to their original design position.

While this invention has been particularly shown and described with references to example embodiments thereof, those skilled in the art will understand that various changes in form and details may be made therein without departing from the scope of the invention encompassed by the appended claims. For example, in most contexts, an assembly may also mean a subassembly. Furthermore, implementations may change the order in which operations are performed. Furthermore, depending on the needs of an implementation, particular operations described herein may be implemented as a combined operation (e.g., steps 320 and 325 in process 300), eliminated, added to, or otherwise rearranged.

What is claimed is:

1. A computer-implemented method for automating motion of a computer-aided design (CAD) model, the method comprising the steps of:
   receiving, by a computer, user selection of an entity in a CAD model, wherein:
      the CAD model represents a real-world object, and the CAD model comprises a plurality of parts, each of which represents a physical object in the real-world object; and
      the user-selected entity is indicative of a face, an edge, or a vertex that belongs to one of the parts of the plurality of parts;
   analyzing, by a processor, the one part of the plurality of parts in a manner that determines and collects data useful to a motion study, wherein the useful data includes one or more of size data, location data, and material type data, the analyzing including automatically determining based on the user selected entity: (i) whether the one part is moveable by a motor or motion element and (ii) location of the motor or motion element on the one part;
   inferring from the useful data a plurality of parameters for automating motion, said inferring being performed by the processor, the inferred plurality of parameters include the determined location on the one part where the motor or the motion element is mounted; and
   automatically executing, by the processor, a simulation process using the inferred plurality of parameters as input, the executed simulation process automating motion of the CAD model with minimal input by a user, wherein the executed simulation process applies the inferred plurality of parameters to constraints of the plurality of parts and produces a motion simulation of the CAD model.

2. The computer-implemented method of claim 1, wherein:
an axis of motion for at least one of the plurality of parts is based on one or more degrees of freedom with respect to the one part of the plurality of parts, and
the one or more degrees of freedom is determined by one of a number of constraints and a location of each constraint.

3. The computer-implemented method of claim 1, wherein the plurality of parameters include at least one of: (a) the one part of the plurality of parts where the one part is directly moved by the motor or the motion element, (b) a type of the motor or motion element, (c) an axis of motion of the one part, and (d) a motion function indicating a change of motion over time.

4. The computer-implemented method of claim 3, wherein:
for the motor or the motion element the type is one of linear, rotational, and along a path, and
the type is dependent upon the entity and one or more degrees of freedom determined by one or more constraints on the one part of the plurality of parts.

5. The computer-implemented method of claim 1, wherein the CAD model is one of a two-dimensional CAD model and a three-dimensional CAD model.

6. The computer-implemented method of claim 1, further comprising:
storing a hierarchical map of parent-child relationships among the plurality of parts; and
using the hierarchical map for automating motion of the CAD model such that a motion of the one part of the plurality of parts is relative to a parent part.

7. The computer-implemented method of claim 1, further comprising displaying an indicator of an implied direction of motion for selection of an explicit direction of motion.

8. A computer-aided design system comprising:
a processor operatively coupled to a data storage system, the data storage system storing a three-dimensional model; and
a data storage memory operatively coupled to the processor and comprising instructions to configure the processor to:
receive user selection of an entity in a CAD model, wherein
the CAD model represents a real-world object and comprises a plurality of parts, each of which represents a physical object in the real-world object; and
the user-selected entity is indicative of a face, an edge, or a vertex that belongs to one of the parts of the plurality of parts;
analyze the one part of the plurality of parts and determine data useful to a motion study, wherein the useful data includes one or more of size data, location data, and material type data, the analyzing including automatically determining based on the user selected entity: (i) whether the one part is moveable by a motor or motion element and (ii) location of the motor or motion element on the one part;
infer from the useful data a plurality of parameters for automating motion, the inferred plurality of parameters include the determined location on the one part where the motor or the motion element is mounted; and
execute a simulation process using the inferred plurality of parameters as input, the executed simulation process automating motion of the CAD model with minimal input by a user,
wherein the executed simulation process applies the inferred plurality of parameters to constraints of the plurality of parts and produces a motion simulation of the CAD model.

9. The computer-aided design system of claim 8, wherein an axis of motion for at least one of the plurality of parts is based on one or more degrees of freedom with respect to the one part of the plurality of parts.

10. The computer-aided design system of claim 9, wherein the one or more degrees of freedom is determined by one of a number of constraints and a location of each constraint.

11. The computer-aided design system of claim 8, wherein the plurality of parameters include at least one of a part that is moved directly by the motor or the motion element, a motor or motion element type, an axis of motion of the part, and a motion function indicating a change of motion over time.

12. The computer-aided design system of claim 8, further comprising instructions to:
store a hierarchical map of parent-child relationships among the plurality of parts; and
use the hierarchical map for automating motion of the CAD model such that a motion of the one part of the plurality of parts is relative to a parent part.

13. The computer-aided design system of claim 8, further comprising instructions to display an indicator of an implied direction of motion for selection of an explicit direction of motion.

14. A non-transitory computer-readable data storage medium comprising instructions causing a computer to:
select an entity in a computer-aided design (CAD) model, wherein
the CAD model represents a real-world object and is comprised of a plurality of parts, each of which represents a physical object in the real-world object; and
the selected entity is indicative of a face, an edge or a vertex that belongs to one of the parts of the plurality of parts;
analyze the one part of the plurality of parts and determine data useful to a motion study, wherein the useful data includes one or more of size data, location data, and material type data, the analyzing including automatically determining based on the user selected entity: (i) whether the one part is moveable by a motor or motion element and (ii) location of the motor or motion element on the one part;
infer from the useful data a plurality of parameters for automating motion, the inferred plurality of parameters include the determined location on the one part where the motor or the motion element is mounted; and
execute a simulation process using the inferred plurality of parameters as input, the executed simulation process automating motion of the CAD model with minimal input by a user,
wherein the executed simulation process applies the inferred plurality of parameters to constraints of the plurality of parts and produces a motion simulation of the CAD model.

15. The computer-readable data storage medium of claim 14, wherein an axis of motion for at least one of the plurality of parts is based on one or more degrees of freedom with respect to the one part of the plurality of parts.

16. The computer-readable data storage medium of claim 15, wherein the one or more degrees of freedom is determined by one of a number of constraints and a location of each constraint.

17. The computer-readable data storage medium of claim 14, wherein the plurality of parameters include at least one of: (a) the one part of the plurality of parts as directly moved by the motor or the motion element, (b) a type of the motor or the motion element, (c) an axis of motion of the one part, and (d) a motion function indicating a change of motion over time.

18. The computer-readable data storage medium of claim 17, wherein:
the type is one of linear, rotational, and along a path, and
the type is dependent upon the entity and one or more degrees of freedom determined by one or more constraints on the one part of the plurality of parts.

19. The computer-aided design system of claim 15, further comprising instructions to:
store a hierarchical map of parent-child relationships among the plurality of parts; and
use the hierarchical map for automating motion of the CAD model such that a motion of the one part of the plurality of parts is relative to a parent part.

20. The computer-aided design system of claim 14, further comprising instructions to display an indicator of an implied direction of motion for selection of an explicit direction of motion.

* * * * *